United States Patent Office 2,780,640
Patented Feb. 5, 1957

2,780,640

PRODUCTION OF ACRYLONITRILE

James F. Gabbett, Jr., Weymouth, and Nat C. Robertson, Wellesley, Mass., assignors, by mesne assignments, to Escambia Chemical Corporation, Pace, Fla., a Delaware corporation No Drawing. Application October 1, 1954,
Serial No. 459,870

7 Claims. (Cl. 260—465.3)

This invention relates to the production of chemicals and in particular to an improved process for the production of acrylonitrile. This application is, in part, a continuation of our copending applications Serial No. 382,199, filed September 24, 1953, and Serial No. 412,635, filed February 25, 1954, now abandoned.

A principal object of the present invention is to produce high yields of acrylonitrile readily and cheaply by reacting hydrogen cyanide with acetylene in the vapor phase in the presence of an improved catalyst.

Another object of the invention is to provide an improved process of the above type which is particularly adapted to the production of high yields of acrylonitrile with very low yields of propionitrile and other undesirable nitriles.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

It is well known that acrylonitrile can be prepared by reacting hydrogen cyanide with acetylene in the vapor phase in the presence of a suitable catalyst. Many catalysts have been reported as suitable for this reaction and include such materials as activated carbon, silica gel and solid, porous materials, having either a high surface activity or little or no surface activity, impregnated with alkali metal cyanides or hydroxides or mixtures of alkali metal cyanides, etc.

Generally, the use of the preferred catalysts in the presence of appreciable quantities of hydrogen, such as when hydrogen is used as a diluent in the feed stream of acetylene, leads to considerably lower yields of acrylonitrile than are obtained with an inert diluent such as nitrogen, while the yields of undesirable nitriles and, in particular, propionitrile are substantially increased. The large increase of propionitrile yield in such an environment is probably due to a hydrogenation of the acrylonitrile at reaction conditions. The present invention is directed to obtaining high yields of acrylonitrile with low yields of propionitrile and other undesirable nitriles, particularly when the reaction is carried out in the presence of appreciable quantities of hydrogen.

The process of the present invention preferably comprises the steps of reacting a mixture of hydrogen cyanide and acetylene in the vapor phase in the presence of a porous support comprising deoxygenated charcoal which has been pretreated with hydrogen cyanide. The charcoal is preferably first impregnated with from about 3% to 15% by weight of an alkali metal hydroxide, cyanide or carbonate. In a preferred embodiment, the deoxygenated charcoal is impregnated with about 10% by weight of an alkali metal hydroxide, the preferred alkali metal hydroxide being sodium hydroxide.

In a preferred aspect of the invention, the porous support is a softwood charcoal due to its lower cost. This charcoal is conditioned for use as a catalyst support by heating in the range of 500° C. to 900° C. and passing hydrogen over the heated charcoal until substantially all of the adsorbed and combined oxygen has been removed. This procedure is also beneficial in removing other materials, such as tars, etc., which would not be desirable in the product. The resulting deoxygenated charcoal is impregnated with an alkali metal hydroxide, cyanide or carbonate. The deoxygenated impregnated charcoal is then preferably treated with hydrogen cyanide at temperatures above about 500° C. Hydrogen cyanide is passed over the heated deoxygenated charcoal until the recovery of hydrogen cyanide in the off-gases is on the order of 80% and above.

In one preferred embodiment of the invention, high yields of acrylonitrile are obtained by reacting a gaseous mixture of hydrogen cyanide and acetylene in the presence of the preferred improved catalyst at temperatures on the order of 450° C. to 700° C. and preferably between about 525° C. and 600° C. In carrying out the present invention, the temperature is controlled within the above preferred limits when the space velocity of the gases passing through the reactor is maintained between about 300 to 800 hr.$^{-1}$ (STP). Under these conditions, temperatures in excess of 600° C. tend to increase the yields of undesirable nitriles, particularly propionitrile, while temperatures below about 525° C. tend to give undesirably low conversions of hydrogen cyanide to acrylonitrile.

A more detailed disclosure of one method of producing acrylonitrile by use of the improved charcoal catalyst is illustrated in the following example which is set forth only for the purpose of illustration and is not to be construed as limiting the invention.

*Example I*

115 grams of an unactivated softwood charcoal were heated, at atmospheric pressure, to a temperature of about 700° C. in a stream of hydrogen for about 24 hours. Water and other oxygenated products formed during the conditioning were removed. The charcoal, on completion of the hydrogenation, was found to weigh 90 grams. 75 grams of the deoxygenated charcoal was then impregnated with an aqueous solution containing about 7.5 grams of sodium hydroxide to provide, after drying, about 10% by weight of sodium hydroxide in the charcoal. Upon completion of the sodium hydroxide impregnation, the catalyst was heated, at atmospheric pressure, at a temperature on the order of about 550° C. in a stream of hydrogen cyanamide, until the recovery of hydrogen cyanide in the off-gases rose to over 80%, which, in this case, was on the order of about 60 minutes. A mixture of acetylene and hydrogen cyanide was passed at a space velocity of about 540 hr.$^{-1}$ (STP) through a Vycor reactor tube containing approximately 82.5 grams of the thus prepared catalyst (i. e., 75 grams of deoxygenated charcoal plus weight of sodium hydroxide). The tube was heated and maintained by means of a molten salt bath within the temperature range of between about 550° C. and 600° C. The mole ratio of acetylene to hydrogen cyanide was about 1.17:1, with the amount of acetylene in the acetylene feed stream amounting to approximately 7.1% and the pressure being substantially atmospheric. The remainder of the representative "Wulff" process acetylene stream (92.9%) consisted mainly of about 32.4% methane, 1.8% ethylene, 3.7% carbon monoxide, 6.5% nitrogen and 48.3% hydrogen. The average conversion of hydrogen cyanide to acrylonitrile of this 70.5-hour run was 66.0% while the average yield of acrylonitrile was 81.6% based on hydrogen cyanide. There was synthesized a weight of acrylonitrile equal to about 12.1 times the weight of the deoxygenated charcoal used in preparing the catalyst. The average yields of propionitrile and acetonitrile based on hydrogen cyanide were 6.0% and 3.2% respectively.

Either softwood or hardwood charcoals have been found to be satisfactory. However, from an economic standpoint, softwood charcoals are preferable.

The temperature at which the unactivated charcoal is heated during the hydrogen treatment may be varied considerably. However, it is best maintained between 500° C. and 900° C. and preferably around 700° C. The time necessary to substantially deoxygenate the unactivated charcoal will also vary, depending on such things as the type of charcoal employed and the temperature. In general, the deoxygenation treatment takes more than 8 hours and preferably between about 12 and 24 hours. The deoxygenation treatment is preferably performed at substantially atmospheric pressure. Although the preferred reducing agent is hydrogen, other reducing agents capable of deoxygenating the unactivated charcoal may be utilized.

The deoxygenated charcoal may be impregnated with from about 3% to 15% by weight of either an alkali metal hydroxide, cyanide or carbonate. Best results have been obtained, however, when the treated charcoal has been impregnated with about 10% by weight of the desired alkali metal hydroxide, cyanide or carbonate. In one particular aspect of the invention, it has been found preferable to employ a deoxygenated charcoal impregnated with about 10% by weight of an alkali metal hydroxide which is preferably sodium or potassium hydroxide. Mixtures of alkali metal compounds may also be used.

After the deoxygenated catalyst has been impregnated, it is preferably treated with hydrogen cyanide, at atmospheric pressure, at temperatures which are on the order of above about 500° C. The time necessary to treat the deoxygenated catalyst with hydrogen cyanide will vary, since it is dependent on such factors as the quantity of catalyst to be treated, throughout rate of hydrogen cyanide, etc. However, the passage of hydrogen cyanide over the deoxygenated catalyst is usually continued until the recovery of hydrogen cyanide in the off-gases is on the order of 80% and above.

The deoxygenated impregnated catalyst is preferably pretreated with hydrogen cyanide since it considerably shortens the time to reach maximum acrylonitrile yields. This may be explained on the theory that the catalyst thus treated will not adsorb any appreciable quantities of hydrogen cyanide during the early stages of the reaction and thus there is no competitive action between the catalyst and the acetylene for the hydrogen cyanide passing through the reactor. The maximum conversion to, and yields of, acrylonitrile are, therefore, obtainable within a very short time after the start of the reaction. The hydrogen cyanide catalyst pretreatment, as a result of obtaining maximum acrylonitrile yields faster, thus permits more acrylonitrile to be obtained per unit of weight of catalyst employed.

The temperature range in the reactor may vary from about 450° C. to about 700° C. However, it is preferably maintained between about 525° C. and 600° C. when the space velocity of the gases passing through the reactor is maintained between about 300 to 800 hr.$^{-1}$ (STP). Under these conditions, high yields of acrylonitrile are obtained while the yields of undesirable nitriles are suppressed and substantially eliminated. Temperatures above about 600° C. at the given space velocities tend to produce higher yields of such undesirable nitriles as propionitrile and acetonitrile at the expense of the hydrogen cyanide recovery and the yield of acrylonitrile. Temperatures below about 525° C. at the given space velocities tend to lead to poor conversions of hydrogen cyanide to acrylonitrile, thus making it commercially unattractive.

The space velocity may vary from about 100 hr.$^{-1}$ (STP) to about 1000 hr.$^{-1}$ (STP), preferred space velocities being on the order of between about 300 and 800 hr.$^{-1}$ (STP) at reaction temperatures between about 525° C. and 600° C. When the space velocity is increased above the preferred range, the temperature control may be extended over a somewhat wider range. At space velocities below the preferred range, a more restricted temperature range may be required to obtain the maximum yields of acrylonitrile. In addition to the space velocity of the gas stream, the concentration of hydrogen in the stream of reacting gases also, to some degree, determines the temperature to be employed. When the reaction is carried out in the presence of large concentrations of hydrogen (above about 30% by volume of the acetylene feed stream) such as shown in Example I, then a close control on the temperature is essential so as to prevent undue hydrogenation of the product. However, at lower hydrogen concentrations (below about 30% of the acetylene feed stream) in the stream of reacting gases, then a more extended temperature range may be permitted.

The molar ratio of acetylene to hydrogen cyanide may be varied quite widely between about 0.8:1 to about 1.6:1 and higher, preferred molar ratios being on the order of between about 0.9:1 to 1.2:1.

In the above example, specific operating conditions have been given. These conditions, however, are subject to considerable variation without departing from the scope of the invention. For example, the pressure range in the reactor may vary from about atmospheric pressure to about 100 pounds per square inch. Other catalysts, such as oxygen-free, porous charcoal supports impregnated with an alkali metal carbonate or cyanide, can be employed in the reaction. While the reaction has been described as being carried out in the presence of appreciable quantities of hydrogen, it is equally applicable to reactions carried out in the absence of hydrogen or in the presence of other diluents.

In the example cited above, a dilute stream of acetylene representative of a "Wulff" process gas stream was employed. The above example, illustrating the use of an acetylene stream containing on the order of about 7% acetylene and an appreciable quantity of hydrogen, shows that high yields of acrylonitrile with low yields of undesired propionitrile can be obtained in the presence of the preferred improved catalyst. The presence of materials such as methane, ethylene, nitrogen and carbon monoxide in a stream of reacting gases as shown in Example I, does not materially affect the behavior of the catalyst in producing high yields of acrylonitrile. Although this invention has been described in connection with the use of dilute acetylene streams, particularly to acetylene streams containing less than about 15% acetylene, it is also applicable to concentrated acetylene streams.

Since certain changes may be made in the above process without departing from the scope of the invention herein involved, it is intended that all matter contained in the above description shall be interpreted as illustrative and not in a limiting sense.

What is claimed is:

1. The process of producing acrylonitrile from hydrogen cyanide and acetylene which comprises heating unactivated charcoal to a temperature above 500° C., passing hydrogen over said heated charcoal until substantially all the oxygen has been removed from said charcoal, impregnating said deoxygenated charcoal with a compound from the group consisting of the alkali metal hydroxides, cyanides and carbonates, passing hydrogen cyanide over said deoxygenated impregnated charcoal while said charcoal is heated above about 500° C. until the recovery of hydrogen cyanide in the off-gases is above 80%, passing hydrogen cyanide and acetylene over the prepared catalyst at a temperature within the range of 450° C. to 700° C., and recovering the acrylonitrile produced.

2. The process according to claim 1 wherein said deoxygenated charcoal is impregnated with from 3% to 15% by weight of sodium hydroxide.

3. The process according to claim 1 wherein said acetylene is a dilute stream of acetylene.

4. The process of producing acrylonitrile from hydrogen cyanide and acetylene which comprises deoxygenating a porous charcoal support, impregnating said treated charcoal with a compound from the group consisting of the alkali metal hydroxides, cyanides and carbonates, passing hydrogen cyanide over said deoxygenated impregnated charcoal while said charcoal is heated above about 500° C. until the recovery of hydrogen cyanide in the off-gases is above 80%, passing hydrogen cyanide and acetylene over the prepared catalyst at a temperature within the range of 525° C. to 600° C., and recovering the acrylonitrile produced.

5. The process of producing acrylonitrile from hydrogen cyanide and acetylene which comprises deoxygenating a porous charcoal support, impregnating said treated charcoal with a compound from the group consisting of the alkali metal hydroxides, cyanides and carbonates, passing hydrogen cyanide over said deoxygenated impregnated charcoal while said charcoal is heated above about 500° C. until the recovery of hydrogen cyanide in the off-gases is above 80%, passing acetylene and hydrogen cyanide in a molar ratio of from about 0.8:1 to about 1.6:1 over the prepared catalyst at a space velocity between about 300 and 800 hr.$^{-1}$ (STP) while said catalyst is maintained at a temperature within the range of 525° C. to 600° C., and recovering the acrylonitrile produced.

6. The process according to claim 5 wherein said porous charcoal support is impregnated with from 3% to 15% by weight of sodium hydroxide.

7. The process according to claim 5 wherein said acetylene stream is a dilute stream of acetylene.

References Cited in the file of this patent

UNITED STATES PATENTS

| | | |
|---|---|---|
| 2,419,186 | Harris et al. | Apr. 15, 1947 |

FOREIGN PATENTS

| | | |
|---|---|---|
| 584,662 | Great Britain | Jan. 20, 1947 |